(12) United States Patent
Van Nieuwenhove et al.

(10) Patent No.: US 8,522,849 B2
(45) Date of Patent: Sep. 3, 2013

(54) SYSTEM AND METHOD FOR THE AUTOMATED DELIVERY AND LAYUP OF RESIN INFUSED FIBERS

(75) Inventors: Stefaan Guido Van Nieuwenhove, Hohenkammer (DE); Mile Ostojic, Munich (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/525,004

(22) Filed: Jun. 15, 2012

(65) Prior Publication Data

US 2012/0247651 A1 Oct. 4, 2012

Related U.S. Application Data

(62) Division of application No. 12/889,745, filed on Sep. 24, 2010, now Pat. No. 8,282,758.

(51) Int. Cl.
*B65H 81/00* (2006.01)

(52) U.S. Cl.
USPC ............................ 156/433; 156/425; 156/441

(58) Field of Classification Search
USPC ......................................... 156/425, 433, 441
See application file for complete search history.

(56) References Cited

U.S. PATENT DOCUMENTS

| | | | | |
|---|---|---|---|---|
| 4,419,170 A | * | 12/1983 | Blad | 156/361 |
| 4,569,716 A | * | 2/1986 | Pugh | 156/510 |
| 5,045,147 A | * | 9/1991 | Benson et al. | 156/429 |
| 5,110,395 A | * | 5/1992 | Vaniglia | 156/353 |
| 5,266,139 A | * | 11/1993 | Yokota et al. | 156/169 |
| 5,766,357 A | * | 6/1998 | Packer et al. | 118/420 |
| 6,491,773 B1 | * | 12/2002 | Miller et al. | 156/64 |
| 6,540,000 B1 | | 4/2003 | Darrieux et al. | |
| 6,607,626 B2 | | 8/2003 | Taggart | |
| 8,037,843 B2 | | 10/2011 | Vermilyea et al. | |
| 2007/0057404 A1 | | 3/2007 | Hager et al. | |
| 2009/0032195 A1 | | 2/2009 | Slyne | |
| 2009/0229760 A1 | | 9/2009 | Hamlyn et al. | |
| 2011/0119231 A1 | * | 5/2011 | Namburu et al. | 707/609 |

FOREIGN PATENT DOCUMENTS

JP 6039133 B 5/1994

OTHER PUBLICATIONS

Stefaan Guido Van Nieuwenhove et al.; "Resin Infusion Apparatus and System, Layup System, and Methods of Using These"; Pending U.S. Appl. No. 12/648,404, filed Dec. 29, 2009; 21 Pages.
Search Report and Written Opinion from corresponding EP Application No. 11180672.5-2307 dated Feb. 6, 2012.

* cited by examiner

*Primary Examiner* — Jeff Aftergut
(74) *Attorney, Agent, or Firm* — Ann M. Agosti (57) ABSTRACT

An automated in-line feed-through system integrating the delivery, application and infusion of a resin to one or more fiber tows and layup of the one or more infused fiber tows to form a composite structure. The system includes an automated resin delivery, deposition and infusion system configured to deposit the resin on one or more fiber tows and form the infused fiber tows. The system integrates an automated layup system including a compaction roller, a guide roller coupled to an extending cylinder, and an auxiliary roller configured to adhere the one or more infused fiber tows to a substrate. The system further includes a controller configured to control system parameters, including the control of tension of the one or more infused fiber tows within the automated layup system. Other aspects of the automated in-line manufacturing system are also provided.

7 Claims, 12 Drawing Sheets

SYSTEM AND METHOD FOR THE AUTOMATED DELIVERY AND LAYUP OF RESIN INFUSED FIBERS

CROSS REFERENCE TO RELATED APPLICATIONS

This application is a Divisional of U.S. patent application Ser. No. 12/889,745, entitled "SYSTEM AND METHOD FOR THE AUTOMATED DELIVERY AND LAYUP OF RESIN INFUSED FIBERS," filed Dec. 23, 2008.

BACKGROUND

The disclosure relates generally to systems for the infusion and layup of resin infused fibers, and more particularly, to automated systems for controllable infusion, delivery and layup of one or more fiber tows.

Resin infused fiber composite materials are being used increasingly in a variety of diverse industries, such as automotive, aircraft, and wind-energy, in part, because of their low weight and high strength properties. It would be desirable to form complex composite components and/or fiber patterns wherein the infusion and layup process are integrated into an automated in-line feed-through system. Current manufacturing processes typically involve the use of fiber pre-forms with subsequent resin infusion, or preimpregnated fiber tows called "prepregs" and a separate layup system and procedure using these infused fiber pre-forms or preimpregnated fiber tows.

Currently, efforts are underway to provide infusion of one or more fiber tows using systems including rollers with resin flowing through holes in the rollers from the bore to the outside surface. These systems, while applicable in many instances, do not permit control of the infusion of individual tows. To provide for control of infusion of individual tows, efforts are also underway to provide infusion of an array of fiber tows using systems including resin flowing through individually controllable nozzles. Irrespective of infusion procedure, subsequent to the infusion process, the one or more fiber tows are subject to layup on a separate component layup tool or tools. This process is time consuming and expensive in that separate systems are utilized to complete the fabrication of composite parts.

It would therefore be desirable to provide an improved automated system that integrates the layup of one or more resin infused fibers with the infusion process utilizing an automated in-line system that integrates the delivery, deposition and infusion of one or more fiber tows with the subsequent layup procedure to complete fabrication of a composite part. In addition, it would be desirable for the automated system to integrate real time in-line infusion for one or more dry fiber tows with the layup of the infused fiber tows for formation of complex composite components.

BRIEF DESCRIPTION

Briefly, one aspect of the disclosure resides in an automated in-line manufacturing system for applying a resin to one or more fiber tows, infusing the one or more fiber tows with the resin to form one or more infused fiber tows and subsequent layup of the one or more infused fiber tows to form a composite part, wherein each of the one or more fiber tows is moving at a respective fiber speed. The automated in-line manufacturing system includes an automated resin delivery, deposition and infusion system, an automated layup system and a controller configured to control the automated layup system. The automated resin delivery, deposition and infusion system is configured to form the one or more resin infused fiber tows. The automated layup system is configured in-line with the automated resin delivery, deposition and infusion system to receive a feed-through of the one or more resin infused fiber tows. The automated layup system comprises at least one guide roller coupled to an extending cylinder, at least one compaction roller disposed downstream from the guide roller and configured to adhere the one or more infused fiber tows to a surface of a substrate, at least one auxiliary roller disposed downstream from the compaction roller and a positioning and control system to orient the guide roller, the compaction roller and the auxiliary roller relative to the surface of the substrate. The controller is configured to control the automated layup system, and control tension of the one or more resin infused fiber tows within the automated layup system.

Another aspect of the disclosure resides in a method of fabricating a composite part using an automated in-line manufacturing system. The method of fabricating a composite part includes infusing a resin into one or more fiber tows to form a supply of one or more resin infused fiber tows; delivering the supply of the one or more resin infused fiber tows to an automated in-line layup system configured to receive the supply of the one or more resin infused fiber tows, positioning the supply of the one or more resin infused fiber tows within the automated layup system and between a surface of the compaction roller and a surface of the substrate, defining a feed-through path; laying up a first course of the one or more resin infused fiber tows onto the surface of the substrate, wherein the compaction roller provides a force to adhere the one or more resin infused fiber tows onto the surface of the substrate; positioning the at least one auxiliary roller proximate an end portion of the first course of the one or more resin infused fiber tows that are adhered to the surface of the substrate; retracting the at least one compaction roller from the one or more resin infused fiber tows; extending the cylinder to move the guide roller and generate a buffer amount in the supply of the one or more resin infused fiber tows; cutting the supply of the one or more resin infused fibers between the at least one compaction roller and the at least one auxiliary roller; rotating the automated in-line layup system about a vertical axis to position it for layup of a subsequent course of the supply of one or more resin infused fibers while simultaneously retracting the at least one auxiliary roller to a storage position; positioning the at least one compaction roller onto the supply of one or more resin infused fibers to adhere the supply of the one or more resin infused fibers to a previous adhered course of the one or more resin infused fibers and form an additional course; moving the automated layup system until the buffer amount in the supply of the one or more resin infused fiber tows is taken up and the supply of one or more resin infused fiber tows begins to be adhered to the previously adhered course, wherein a tension on the supply of one or more resin infused fiber tows as provided by the adhered portion of the additional course is greater than the low tension provided by the buffer amount; and repeating the previous steps to define a plurality of courses defining the composite part. The automated layup system comprises at least one guide roller coupled to an extending cylinder, at least one compaction roller disposed downstream from the guide roller and at least one auxiliary roller disposed downstream from the compaction roller, the at least one compaction roller and the at least one auxiliary roller configured to adhere the one or more infused fiber tows to a surface of a substrate, and a positioning and control system to orient the guide roller, the compaction roller and the auxiliary roller about a vertical axis and relative to the surface of the substrate.

Another aspect of the disclosure resides in a method of fabricating a composite part using an automated in-line manufacturing system. The method of fabricating a composite part includes infusing a resin into one or more fiber tows to form a supply of one or more resin infused fiber tows; delivering the supply of the one or more resin infused fiber tows to an automated in-line layup system configured to receive the supply of the one or more resin infused fiber tows; positioning the supply of the one or more resin infused fiber tows within the automated layup system and between a surface of the compaction roller and a surface of the substrate, defining a feed-through path; disposing an initial portion of the supply of the one or more resin infused fiber tows onto the surface of the substrate at a first tension; laying up a first course of the one or more resin infused fiber tows onto the surface of the substrate, wherein the compaction roller provides a force to adhere the one or more resin infused fiber tows onto the surface of the substrate; positioning the at least one auxiliary roller proximate an end portion of the first course of the one or more resin infused fiber tows that are adhered to the surface of the substrate; retracting the at least one compaction roller from the one or more resin infused fiber tows; extending the cylinder to move the guide roller and generate a buffer amount in the supply of the one or more resin infused fiber tows; positioning a plurality of clamping rollers above and below the supply of the one or more resin infused fibers and clamping the clamping rollers to the supply of the one ore more resin infused fibers, the clamping rollers disposed between the at least one compaction roller and the at least one auxiliary roller; cutting the supply of the one or more resin infused fibers between the plurality of clamping rollers and the at least one auxiliary roller; moving the auxiliary roller on the supply of the one or more resin infused fibers to adhere and end portion of the first course of the one or more resin infused fibers onto the surface of the substrate; rotating the automated in-line layup system about a vertical axis to position it for layup of a subsequent course of the supply of one or more resin infused fibers while simultaneously retracting the at least one auxiliary roller to a storage position; positioning the at least one compaction roller onto the supply of one or more resin infused fibers to adhere the supply of the one or more resin infused fibers to a previous adhered course of the one or more resin infused fibers and form an additional course; rotating the clamping rollers to unroll an end of the supply of one or more resin infused fibers and complete laying up of an end portion of the additional course to the previously adhered course; retracting the clamping rollers into a storage position; moving the automated layup system to provide layup of the supply of one or more resin infused fibers while simultaneously retracting the extended cylinder to maintain a low tension on the supply of one or more resin infused fiber tows provided by the buffer amount in the supply of the one or more resin infused fiber tows; continuing to move the automated layup system until the buffer amount in the supply of the one or more resin infused fiber tows is taken up and the supply of one or more resin infused fiber tows begins to be adhered to the previously adhered course, wherein a tension on the supply of one or more resin infused fiber tows as provided by the adhered portion of the additional course is greater than the low tension provided by the buffer amount; and repeating the previous steps to define a plurality of courses defining the composite part. The automated layup system comprising at least one guide roller coupled to an extending cylinder, at least one compaction roller disposed downstream from the guide roller and at least one auxiliary roller disposed downstream from the compaction roller, the at least one compaction roller and the at least one auxiliary roller configured to adhere the one or more infused fiber tows to a surface of a substrate, and a positioning system to orient the guide roller, the compaction roller and the auxiliary roller about a vertical axis and relative to the surface of the substrate.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
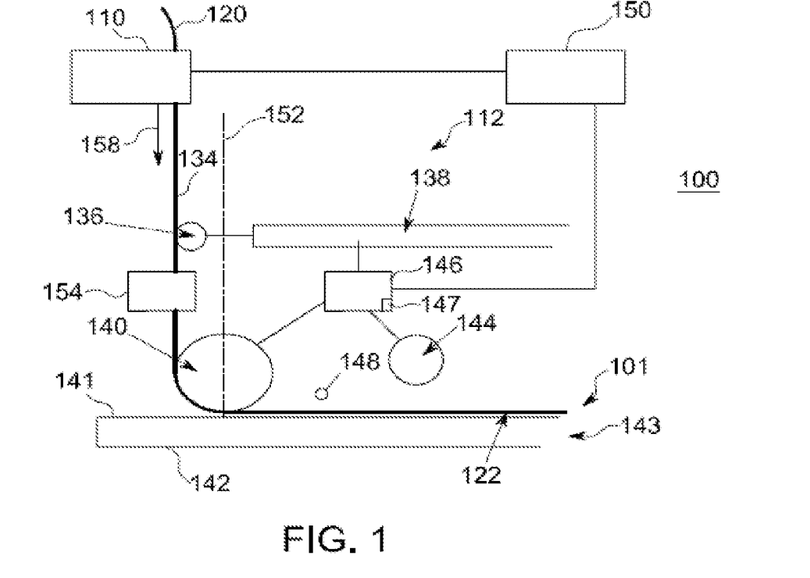
FIG. 1 schematically depicts in side view, an automated in-line manufacturing system for resin delivery, application and infusion to form infused fiber tows and subsequent layup to form a composite part according to an embodiment.

An automated resin delivery, deposition and infusion system 110 for delivering and applying a resin to one or more dry fiber tows 120, infusing the fiber tows with a resin to form one or more resin infused fiber tows 134 and an automated in-line layup system 112 for subsequent layup of the one or more resin infused fiber tows 134 is described generally with reference to FIG. 1. The automated resin delivery, application and infusion system 110 is integrated into the automated in-line layup, or fiber placement system 112 to form a composite automated in-line manufacturing system 100, an example arrangement of which is shown in FIG. 1. This arrangement enables real-time, inline infusion of the one or more dry fiber tows 120, with control of the resin application (and consequently infusion) rate for each of the tows 120, and subsequent layup of the one or more resin infused fiber tows 134 to form a composite part 101, based on part specific requirements. The resulting system 100 can be used to fabricate composite parts or structures, non-limiting examples of which include low weight, high strength aircraft and automotive components.

For the example arrangement shown in FIG. 1, the automated resin delivery, deposition and infusion system 110 includes a resin delivery, deposition and infusion portion comprising a means for delivery, depositing and infusing a resin onto the one or more dry fiber tows 120.

With regard to the resin and one or more fiber tows 120, the disclosure is not limited to specific resins or fiber types. However, in one non-limiting example, the resin that is infused into the fiber tows 120 is a thermoset resin useful in composite fibers. Examples of suitable thermoset resins that may be utilized include, but are not limited to epoxies, polyesters, vinylesters, phenolic resins, polyurethanes, polyamides, or combinations of two or more of these. In addition, any suitable reinforcing material may be infused using the apparatus, systems and methods described herein. For example, relatively continuous fibers, or tows, may be arranged to form a unidirectional array of fibers, a cross-plied array of fibers, or bundled in tows that are arranged to form a unidirectional array of tows, or that are woven or cross-plied to form a two-dimensional array, or that are woven or braided to form a three-dimensional fabric. For three-dimensional fabrics, sets of unidirectional tows may, for example, be interwoven transverse to each other.

Useful fibers to be included in such reinforcing materials, such as tapes, or fabrics, include without limitation, glass fibers, carbon and graphite fibers, basalt fibers, polymeric fibers, including aramide fibers, boron filaments, ceramic fibers, silica fibers, and the like. The fibers may be nonconductive or conductive, depending upon the desired application of the composite fiber. In this particular non-limiting example, the resin 130 is an epoxy resin, and the one or more fiber tows 120 comprise carbon fibers. However, the disclosure is not limited to these specific resins or fiber types.

In a non-limiting example, the automated resin delivery, deposition and infusion system 110 may include one or more nozzles configured to deposit the resin on a respective one of the one or more fiber tows 120. Additional aspects of an application and infusion system incorporating the use of nozzles is further described in copending application, entitled, "Resin Application and Infusion System", bearing U.S. patent application bearing Ser. No. 12/575,668, filed by the same assignee, and incorporated herein by this reference.

In an alternative non-limiting example, the automated resin delivery, deposition and infusion system 110 may include one or more infusion rollers each having an interior arcuate surface and an exterior arcuate surface and a plurality of perforates formed therein, wherein the one or more infusion rollers are configured in fluidic communication with the resin. Additional aspects of an application and infusion system incorporating the use of one or more infusion rollers and perforates is further described in copending application, entitled, "Resin Infusion Apparatus and System, Layup System, and Methods of Using These", bearing U.S. patent application bearing Ser. No. 12/648,404, and incorporated herein by this reference.

The automated in-line layup system 112 is disposed in feed-through positioning with the automated resin delivery, deposition and infusion system 110. More specifically, the automated in-line layup system 112 is aligned to receive a feed-through 158 of the one or more fiber tows 120 after infusion of the resin, and more particularly to receive a supply 132 of the one or more resin infused fiber tows 134. The automated in-line layup system 112 is generally comprised of at least one guide roller 136 coupled to an extending cylinder 138, at least one compaction roller 140 disposed downstream from the guide roller 136 and configured to adhere the one or more infused fiber tows 134 to a surface 141 of a substrate 142, and at least one auxiliary roller 144 disposed downstream from the compaction roller 140.

The automated in-line layup system 112 may further include a plurality of clamping, or pinching, rollers 148 disposed in-line with the feed-through 158, and more particularly disposed between the at least one compaction roller 140 and the at least one auxiliary roller 144. The plurality of clamping rollers 148 provide for a clamping force during a cutting step (described below) and adhering of an end portion of the one or more resin infused fiber tows to the surface 141 of the substrate 142 (described below).

The at least one compaction roller 140 is configured to deliver a force to adhere the one or more infused fiber tows 134 to a surface 141 of a substrate 142, such as a mold or layup tool 143. During setup, the consistency of the resin chosen is such that the resin will be tacky enough to adhere to the substrate 141 rather than the compaction roller 140. The automated in-line layup system 112 may further include a positioning and control system 146 coupled to the guide roller 136, the compaction roller 140 and the auxiliary roller 144 to orient the automated in-line layup system 112 components, and more particularly the guide roller 136, the compaction roller 140 and the auxiliary roller 144, about a vertical axis 152 and relative to the surface 141 of the substrate 142. In addition, the positioning and control system 146 may provide control of parameters, such as spacing, or the like of the plurality of clamping rollers 148 and extension of the extending cylinder 138 and thereby provide control of the feed-through 158 tension. To achieve such monitoring, the positioning and control system 146 may further include one or more sensors 147 for monitoring a tension of the one or more resin infused fiber tows 134 within the automated layup system 112.

In one non-limiting example, the automated in-line layup system 112 may be mounted on a robotic head (not shown) in front of the substrate 142, or mold, such that the one or more resin infused fiber tows 134 will adhere to the substrate 142 and pull the supply 132 of one or more resin infused fiber tows 134 through the automated resin delivery, deposition and infusion system 110 due to a tension on the supply 132 of the one or more resin infused fiber tows 134 when the automated in-line layup system 112 moves with respect to the substrate 142.

As indicated in FIG. 1, the composite automated in-line manufacturing system 100 may further include a controller 150 configured to control the automated resin delivery, deposition and infusion system 110 and the automated in-line layup system 112. The controller 150 may exchange information with the automated in-line layup system 112, and more particularly the positioning system 146, as indicated in FIG. 1, to optimize the laydown sequence. The controller 150 may be further configured to control the automated resin delivery, deposition and infusion system 110, the fiber speed of the respective one of the one or more fiber tows 120, provide temperature control of the resin, the one or more resin infused fiber tows 134 and the automated layup system 112, and control tension of the supply 132 of the one or more infused fiber tows 134 within the automated layup system 112. While separate controllers may be employed for the composite automated in-line manufacturing system 100, and more particularly for the automated resin delivery, deposition and infusion system 110 and for the automated layup system 112, this control integration is required. The controller 150 is configured to optimize the infusion and the laydown sequence. In some embodiments, the controller 150 may comprise one or more processors. It should be noted that the present disclosure is not limited to any particular processor for performing the processing tasks of the disclosure. The term "processor," as that term is used herein, is intended to denote any machine capable of performing the calculations, or computations, necessary to perform the tasks of the disclosure, and to control the mechanical and electrical devices in the disclosure. The term "processor" is intended to denote any machine that is capable of accepting a structured input and/or of processing the input in accordance with prescribed rules to produce an output, as will be understood by those skilled in the art.

In certain non-limiting examples, the automated in-line layup system 112 may further include a cooling module 154 disposed in feed-through positioning with the supply 132 of one or more resin infused fiber tows 134. Non-limiting examples of the cooling module 154 include an air cooler and coolers sold under the tradename Vortex Coolers by ITW Air Management, having a place of business in Cincinnati, Ohio. For certain embodiments, the cooling module 154 cools the supply 132 of one or more resin infused fiber tows 134 to a temperature in a range of about 40° F. to about 70° F. For the configuration shown in FIG. 1, the cooled, one or more resin-infused fiber tows 134 are then compacted onto the surface 141 of the substrate 142 by the compaction roller 140 to form a course 122 the composite part 101.

The specific configuration of the composite automated in-line manufacturing system 100 may vary based on the application and the configuration of the composite part being manufactured.

Referring now to FIGS. 2-19, illustrated are the steps in a method of delivery and layup of one or more resin infused fiber tows 134 using the automated in-line manufacturing system 100 of FIG. 1 to form the composite part 101. Component parts illustrated in FIGS. 2-19 that are the same as those previously described with reference to FIG. 1 are given their same reference numbers in FIGS. 2-19. In addition, certain component parts previously introduced and described with reference to FIG. 1 while illustrated in FIGS. 2-19, may not be described further.

Figure 2:
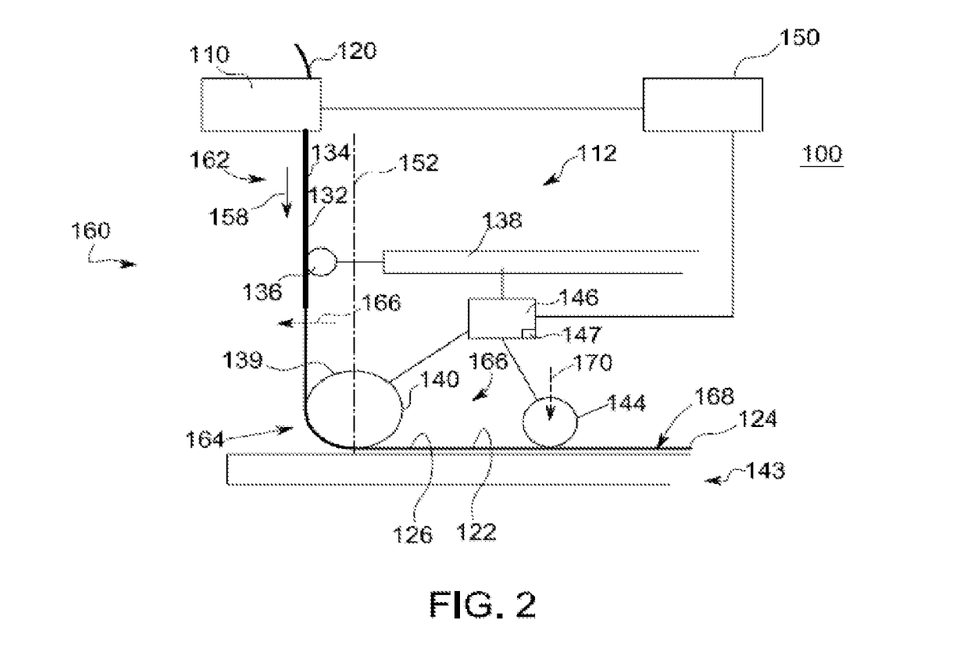
FIG. 2 schematically depicts in side view, a step in the method of using an automated in-line manufacturing system to form a composite part according to an embodiment.

Illustrated in FIG. 2 is a first step in a method of fabricating the composite part 101 using the automated in-line manufacturing system 100. During the manufacturing process, resin is infused into the one or more fiber tows 120 to form the supply 132 of one or more resin infused fiber tows 134. The one or more resin infused fiber tows 134 are delivered 162 via the feed-through path 158 to the automated in-line layup system 112 configured to provide a layup process 160. As previously described with reference to FIG. 1, the automated layup system 112 is configured to feed the supply 132 of the one or more resin infused fiber tows 134 relative to the at least one guide roller 136 coupled to the extending cylinder 138, the at least one compaction roller 140 disposed downstream from the guide roller 136 and the at least one auxiliary roller 144 disposed downstream from the compaction roller 140. The positioning and control system 146 orients the guide roller 136, the compaction roller 140 and the auxiliary roller 144 about the vertical axis 152 and relative to the surface 141 of the substrate 142 and provides feed-through of the one or more resin infused fiber tows 134. The supply 132 of the one or more resin infused fiber tows 134 is positioned 164 within the automated in-line layup system 112, and more particularly between a surface 139 of the compaction roller 140 and the surface 141 of the substrate 142. An initial portion 124 of the supply 132 of the one or more resin infused fiber tows 143 is adhered 166 to the surface 141 of the substrate 142 at a first tension. As the automated in-line layup system 112 moves 166 in a forwardly direction relative to the layup tool 143, the one or more resin infused fiber tows 134 are adhered 168 to the surface 141 of the substrate 142 by the compaction roller 140, and thus forming the first course 122. During the layup process 160, the compaction roller 140 provides a force to adhere the material, and more particularly the one or more resin infused fiber tows 134, onto the surface 141 of the substrate 142. In one non-limiting example, the compaction roller 140 may be motorized to provide rotation of the compaction roller 140 at the same speed as movement of the one or more resin infused fiber tows 132 through the automated layup system 112. The material that is being adhered to the surface 141 of the substrate 142 is pulled from the supply 132 of one or more resin infused fiber tows 134 by virtue of the friction of the portion of the material that is already adhered to the surface 141 of the substrate 142. This adhered portion facilitates proper layup and tensioning during the layup process 160. During the initial setup, this tension can cause issues during the start of the layup when insufficient material has been adhered to provide a counter force. To remedy this, an initial amount of material will be prepared and delivered to the automated layup system 112 at a very low tension.

As illustrated in FIG. 2, after the first course 122 has been adhered to the surface 141 of the substrate 142 and the automated layup system 112 is nearing an end portion 126 of the first course 122, the at least one auxiliary roller 144 is lowered 170 to proximate the end portion 126 of the first course 122 of the one or more resin infused fiber tows 134 that are adhered to the surface 141 of the substrate 142.

Figure 3:
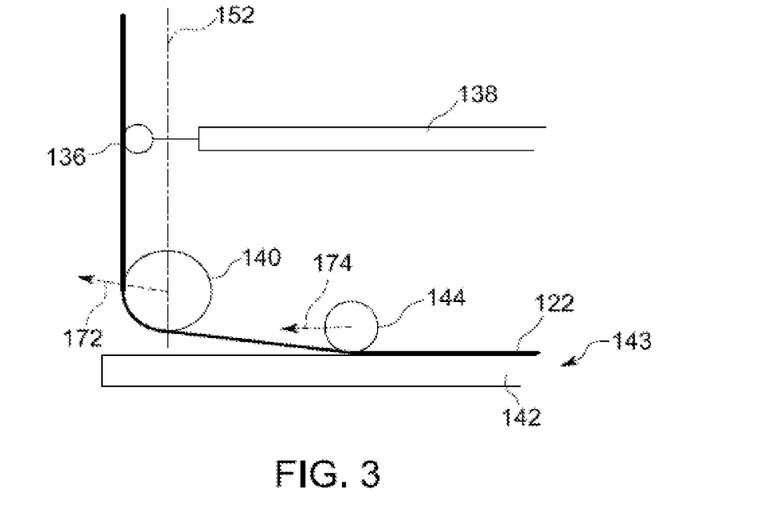
FIG. 3 schematically depicts in side view, a step in the method of using an automated in-line manufacturing system to form a composite part according to an embodiment.

Referring now to FIG. 3, the at least one compaction roller 140 is next retracted 172 from the one or more resin infused fiber tows 134. More specifically, subsequent to the lowering of the at least one auxiliary roller 144 onto the end portion 126, the compaction roller 140 is moved in an upwardly direction, away from the adhered material, while the auxiliary roller 144 remains in contact with the adhered first course 122 of material. During the retraction 172 of the compaction roller, the automated layup system 112, and in particular the at least one auxiliary roller 144 continues moving 174 in a forwardly manner that provides for adherence of the end portion 126 of the one or more resin infused fiber tows 134 to the surface 141 of the substrate 142.

Figure 4:
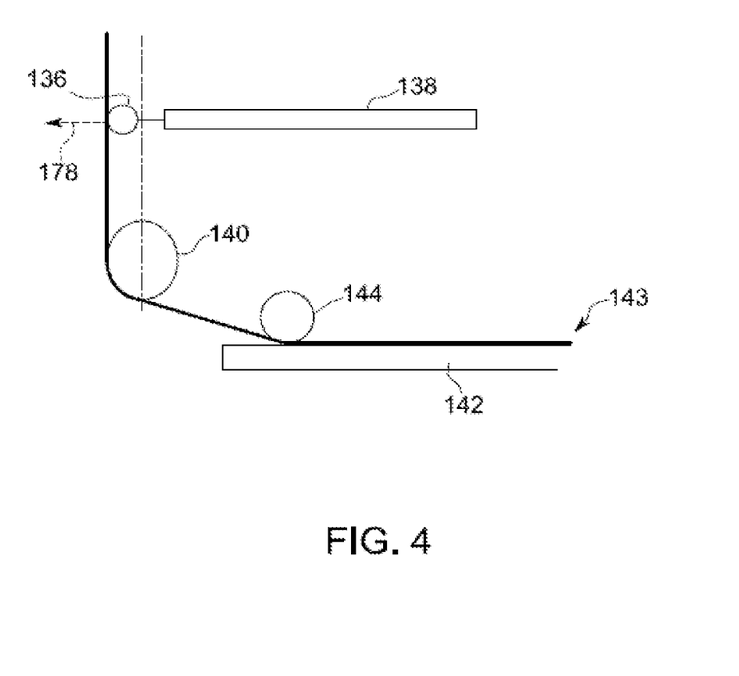
FIG. 4 schematically depicts in side view, a step in the method of using an automated in-line manufacturing system to form a composite part according to an embodiment.
Figure 5:
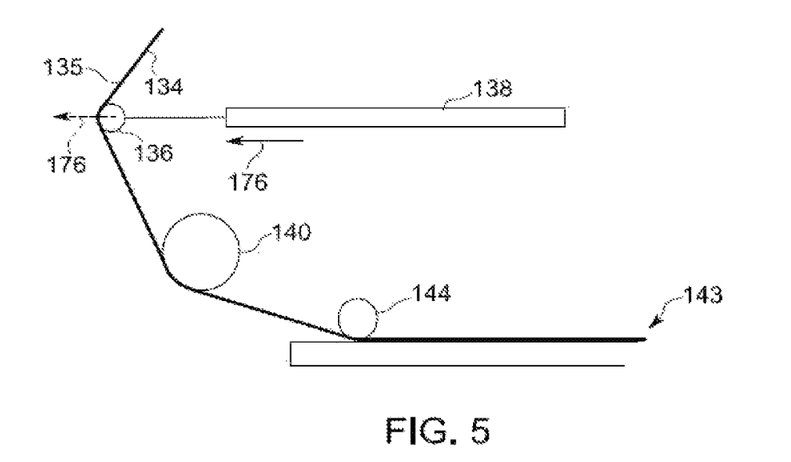
FIG. 5 schematically depicts in side view, a step in the method of using an automated in-line manufacturing system to form a composite part according to an embodiment.
Figure 6:
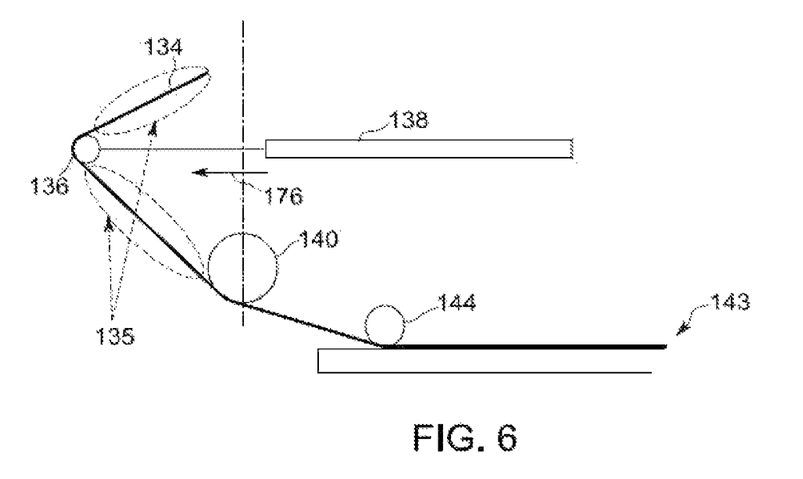
FIG. 6 schematically depicts in side view, a step in the method of using an automated in-line manufacturing system to form a composite part according to an embodiment.
Figure 7:
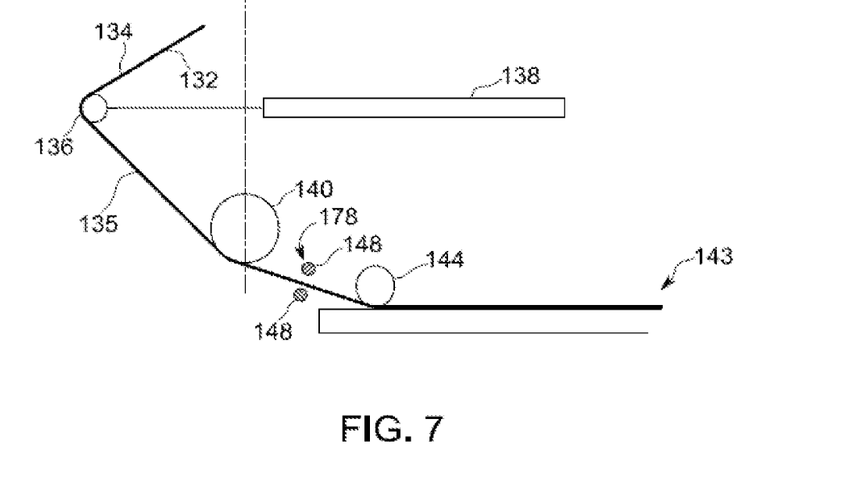
FIG. 7 schematically depicts in side view, a step in the method of using an automated in-line manufacturing system to form a composite part according to an embodiment.
Figure 8:
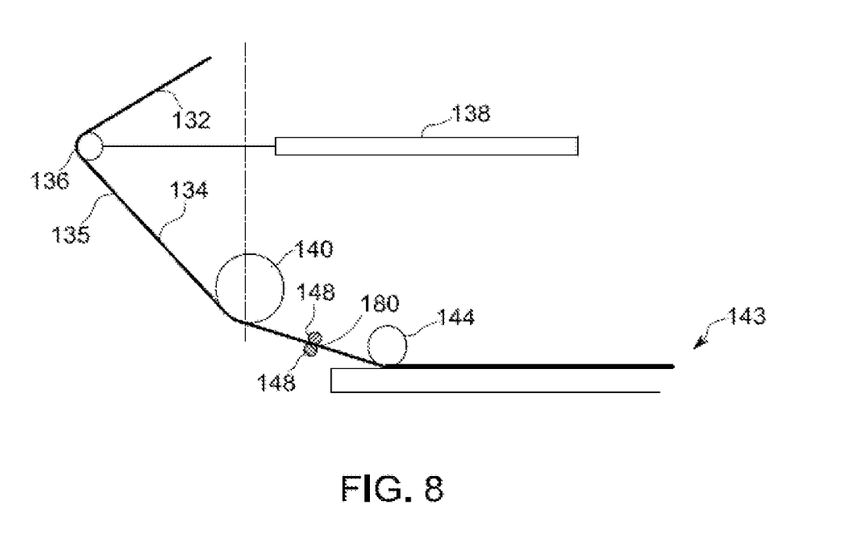
FIG. 8 schematically depicts in side view, a step in the method of using an automated in-line manufacturing system to form a composite part according to an embodiment.

In continuation of the layup process 160 as illustrated in FIGS. 4-6, the automated layup system 112 is stopped in a position allowing for the auxiliary roller 144 to remain on the surface 141 of the substrate 142 as illustrated in FIG. 4. The extending cylinder 138 is extended 176 to move 178 the at least one guide roller 136 in a manner that generates a buffer 135 (FIG. 5) in the supply 132 of the one or more resin infused fiber tows 134 between the automated resin delivery, application and infusion system 110 and the compaction roller 140. The buffer 135 in the supply 132, as described presently, provides the one or more resin infused fiber tows 134 at a minimal tension to the layup point. During this process, the auxiliary roller 144 remains adjacent the layup tool 143 to provide a counterforce against the tension in the supply 132 of one or more resin infused fiber tows 134.

Figure 9:
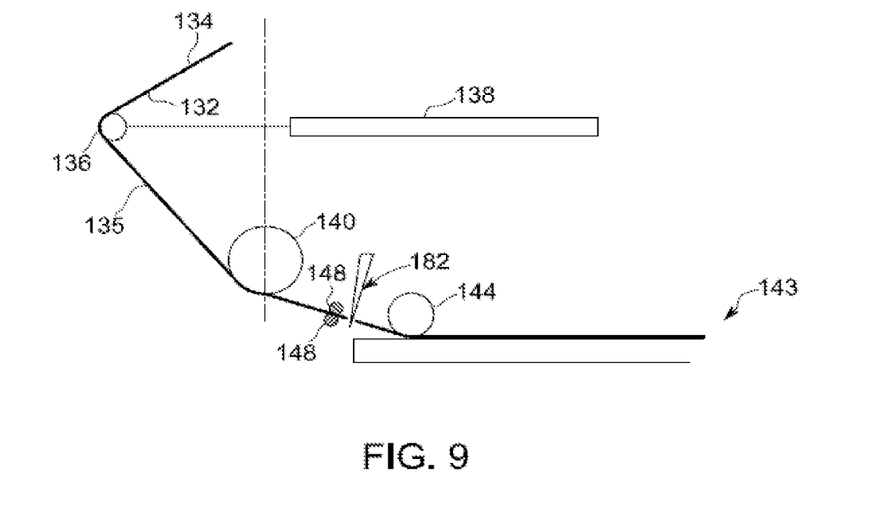
FIG. 9 schematically depicts in side view, a step in the method of using an automated in-line manufacturing system to form a composite part according to an embodiment.
Figure 10:
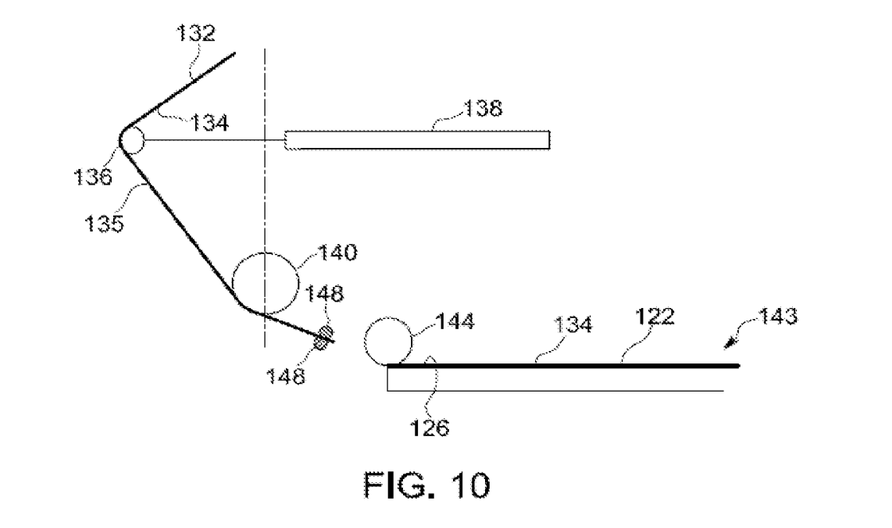
FIG. 10 schematically depicts in side view, a step in the method of using an automated in-line manufacturing system to form a composite part according to an embodiment.

Subsequent to full extension of the extending cylinder 138 and generation of a total amount of buffer 135 in the supply 132 of the one or more resin infused fiber tows 134, the plurality of clamping rollers 148 are positioned 178 above and below the one or more resin infused fiber tows 124 as best illustrated in FIGS. 7-15. More specifically, the clamping rollers 148 are disposed between the compaction roller 140 and the auxiliary roller 144 and provide for clamping 180 of the one or more resin infused fiber tows 134, thus securing the one or more resin infused fiber tows 134 and preventing them from being pulled in a backwardly direction due to tension. Next, the one or more resin infused fiber tows 134 undergo a cutting process 182 being cut between the plurality of clamping rollers 148 and the at least one auxiliary roller 144 as illustrated in FIG. 9. Subsequent to the cutting process 182, the at least one auxiliary roller 144 is moved 184 in a forwardly manner relative to the adhered one or more resin infused fiber tows 134 to adhere the end portion 126 of the first course 122 of the one or more resin infused fiber tows 134 onto the surface 141 of the substrate 142, as best illustrated in FIG. 10.

Figure 11:
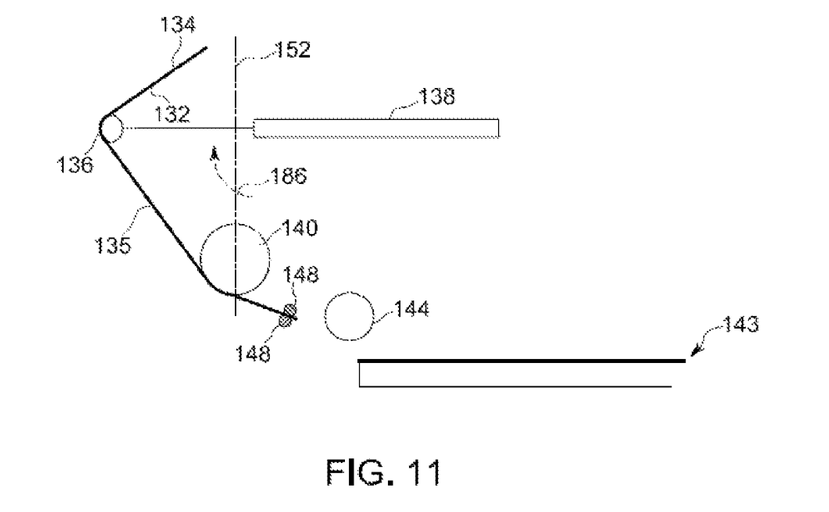
FIG. 11 schematically depicts in side view, a step in the method of using an automated in-line manufacturing system to form a composite part according to an embodiment.
Figure 12:
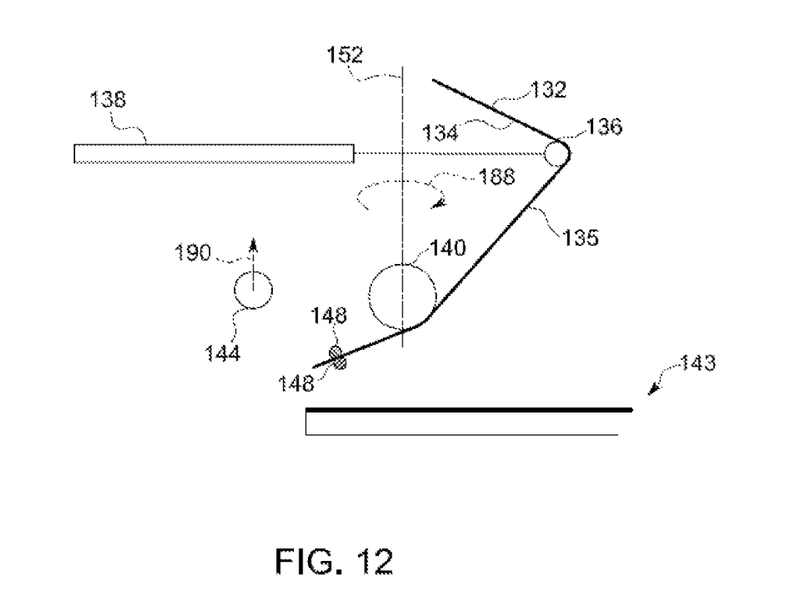
FIG. 12 schematically depicts in side view, a step in the method of using an automated in-line manufacturing system to form a composite part according to an embodiment.
Figure 13:
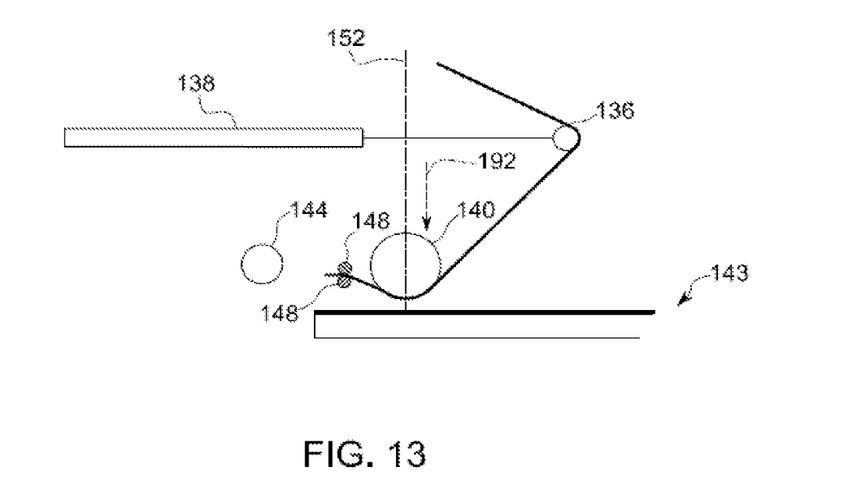
FIG. 13 schematically depicts in side view a step in the method of using an automated in-line manufacturing system to form a composite part according to an embodiment.

Referring now to FIGS. 11 and 12, subsequent to reaching an end of the layup tool 143, the automated in-line layup system 112 continues to move forward and upward 186 to clear the layup tool 143. The automated in-line layup system 112 is next rotated 188 about the vertical axis 152 to position the automated in-line layup system 112 for layup of a subsequent course of the supply 132 of one or more resin infused fiber tows 134. It should be noted, that in this non-limiting exemplary embodiment the automated in-line layup system 112 is rotated approximately 180 degrees about the vertical axis 152 to provide for layup of a subsequent course of the supply 132 on a surface of the previous course 122, but that alternate angular positioning of the automated in-line layup system 112 about axis 152 is anticipated by this disclosure to provide for an alternate layup parameters related to the subsequent course of the supply 132.

Figure 14:
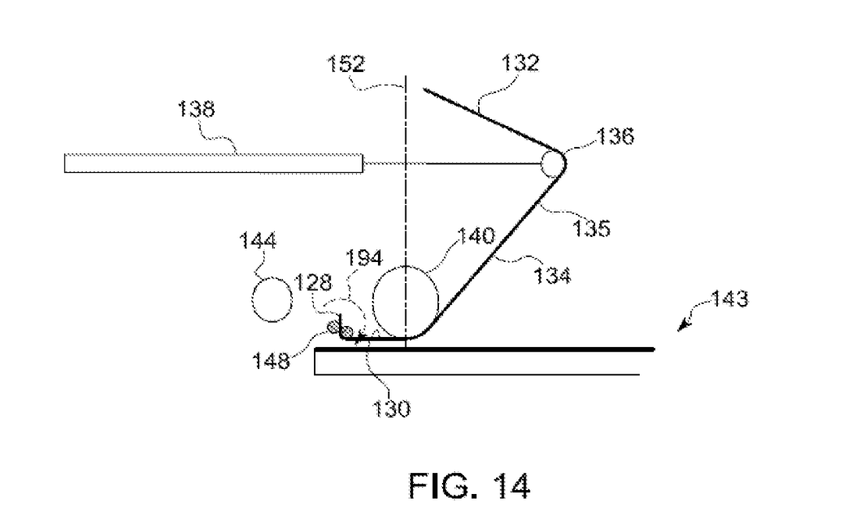
FIG. 14 schematically depicts in side view, a step in the method of using an automated in-line manufacturing system to form a composite part according to an embodiment.
Figure 15:
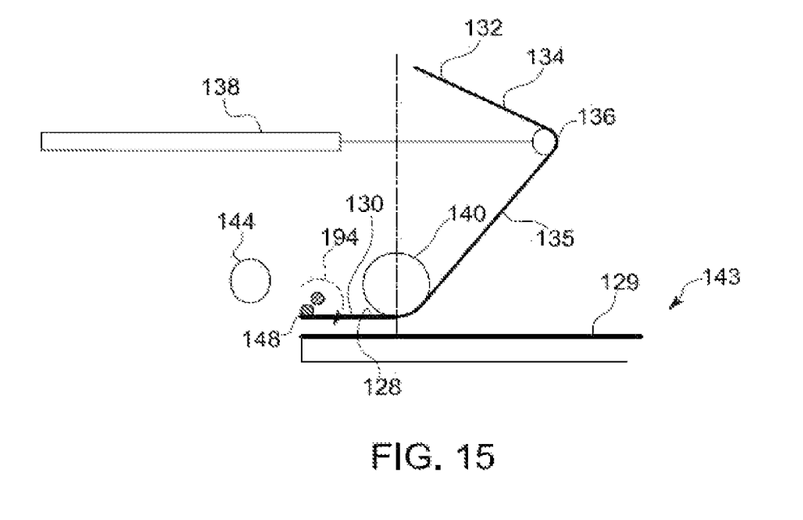
FIG. 15 schematically depicts in side view, a step in the method of using an automated in-line manufacturing system to form a composite part according to an embodiment.

Simultaneous with the rotation of the automated in-line layup system 112, the at least one auxiliary roller 144 may be retracted 190 to a storage position. Next, the at least one compaction roller 140 is positioned 192 again onto the supply 132 of one or more resin infused fiber tows 134 to adhere the supply 132 of the one or more resin infused fiber tows 134 to a previously adhered course 129 (in the sequence of method steps thus far, the first course 122), and form an additional course 130. More particularly, the compaction roller 140 is moved in a downwardly direction until is touches the layup tool 143 with the required compaction force. To achieve layup of an end portion 128 of the additional course 130 as depicted in FIGS. 14 and 15, the clamping rollers 148 are rotated 194 to unroll the end portion 128 of the additional course 130 of the one or more resin infused fiber tows 134 and complete laying up of the end portion 128 to the previously adhered course 129. After the end portion 128 is adhered to the previous course 107, the plurality of clamping rollers 148 are retracted 196 into a storage position.

Figure 16:
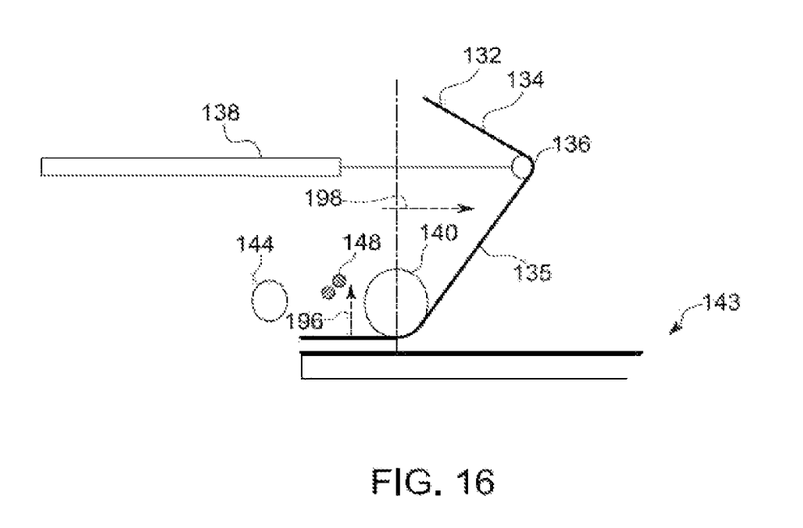
FIG. 16 schematically depicts in side view, a step in the method of using an automated in-line manufacturing system to form a composite part according to an embodiment.
Figure 17:
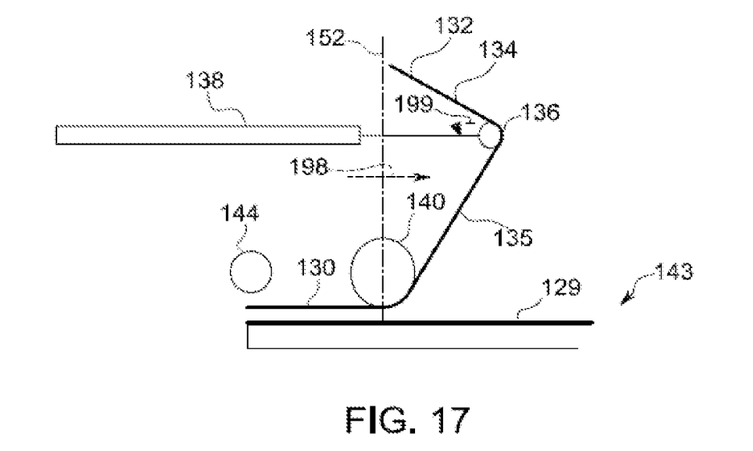
FIG. 17 schematically depicts in side view, a step in the method of using an automated in-line manufacturing system to form a composite part according to an embodiment t.
Figure 18:
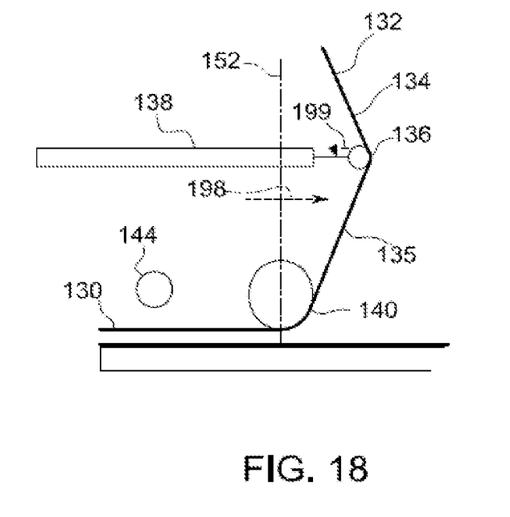
FIG. 18 schematically depicts in side view, a step in the method of using an automated in-line manufacturing system to form a composite part according to an embodiment.
Figure 19:
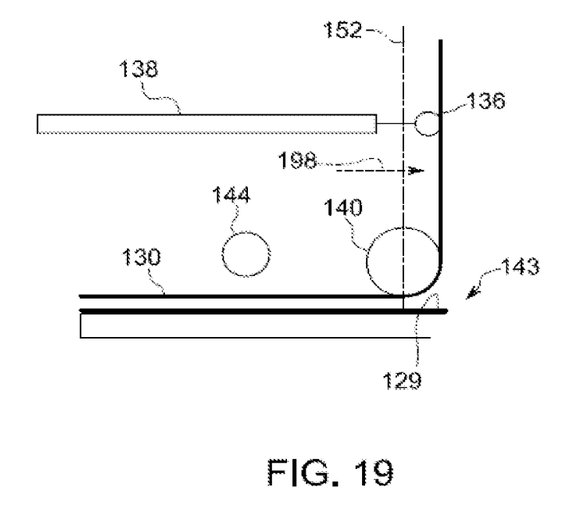
FIG. 19 schematically depicts in side view, a step in the method of using an automated in-line manufacturing system to form a composite part according to an embodiment.

Referring now to FIGS. 16-18, the automated in-line layup system 112 at this time begins to move forward 198 relative to the layup tool 143. The one or more resin infused fiber tows 134 are supplied at this point at a very low tension by using, or taking-up, the buffer 135 of material. The use of the buffer 135 of material is controlled by the positioning and control system 146. This low tension at the beginning of the layup of each subsequent course is necessary to facilitate proper positioning of the material relative to the layup tool 143. During this time, in which the buffer 135 is being utilized, the infusion process may be slowed or stopped. When the infusion process is continuous (not slowed or stopped), an additional buffer of the resin infused fiber tows may be included. Simultaneous with the movement of the automated in-line layup system 112 and layup of the additional course 130, the extended cylinder 138 is retracted 199 to maintain a low tension on the supply of one or more resin infused fiber tows 134 provided by the buffer 135 in the supply 132 of the one or more resin infused fiber tows 134. The automated in-line layup system 112 continues to move 198 in a forwardly direction, as illustrated in FIG. 19, until the buffer 135 in the supply 132 of the one or more resin infused fiber tows 134 is taken up and begins to be adhered to the previously adhered course 107. The tension on the supply 132 of one or more resin infused fiber tows 134 as provided by the adhered portion of the additional course 130 is greater than the tension provided by the buffer 152. Subsequent to the layup of the additional course 130, the process of end portion layup, cutting, rotating of the automated in-line layup system 112 and layup of subsequent courses is repeated to facilitate buildup of the plurality of courses that form the composite part 101.

During the layup process 160, and more particularly at the start up of each course, it is important that the tension on the supply 132 of the one or more resin infused fiber tows 134 be very low. If the tension is too high, the material will start to slip, causing damage to the previous adhered courses, or plies, and cause an error in the geometry of the composite part 101 being manufactured.

Figure 20A:
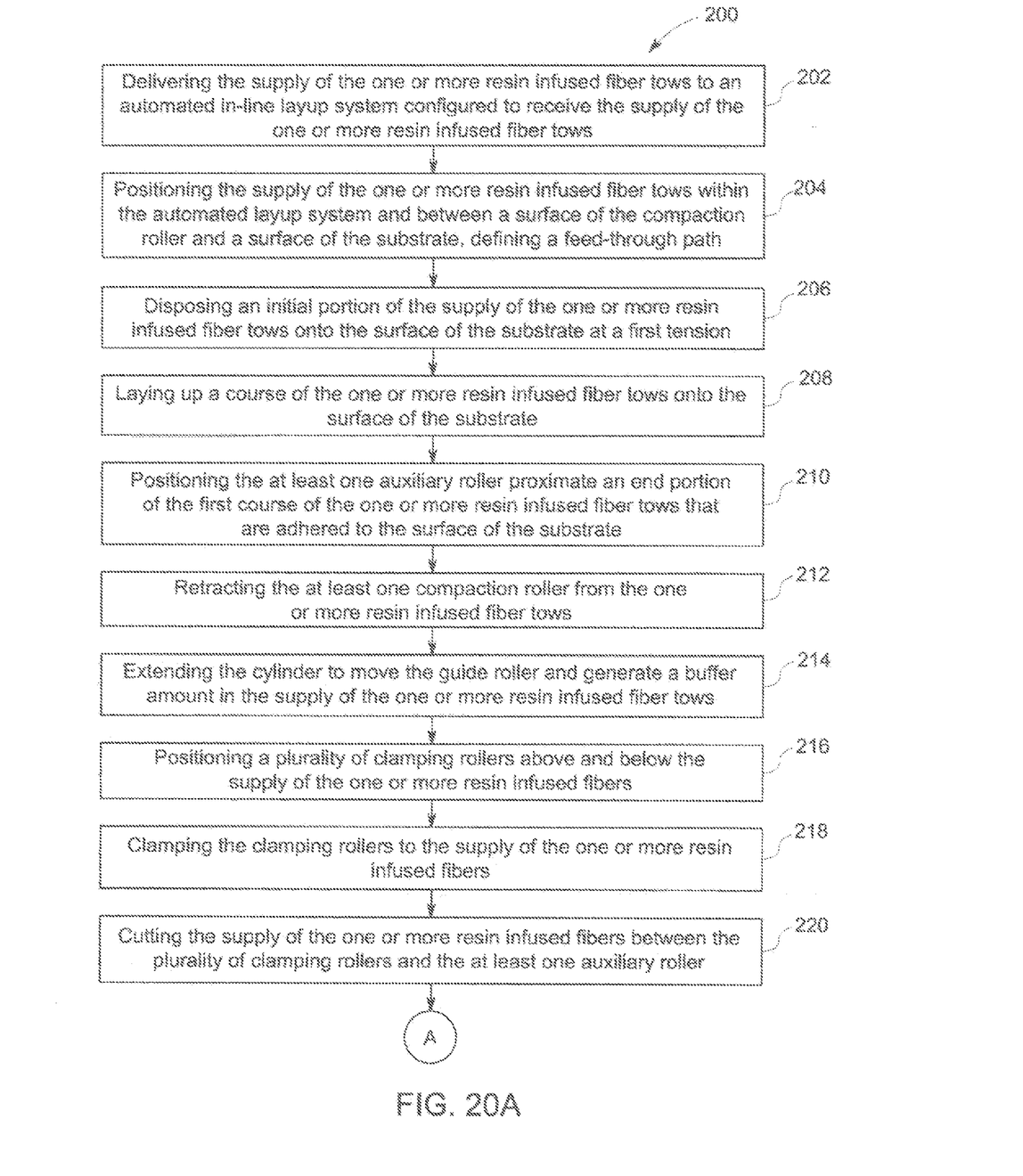
FIGS. 20A and 20B are a flow chart depicting the method of using an automated in-line manufacturing system to form a composite part according to an embodiment.
Figure 20B:
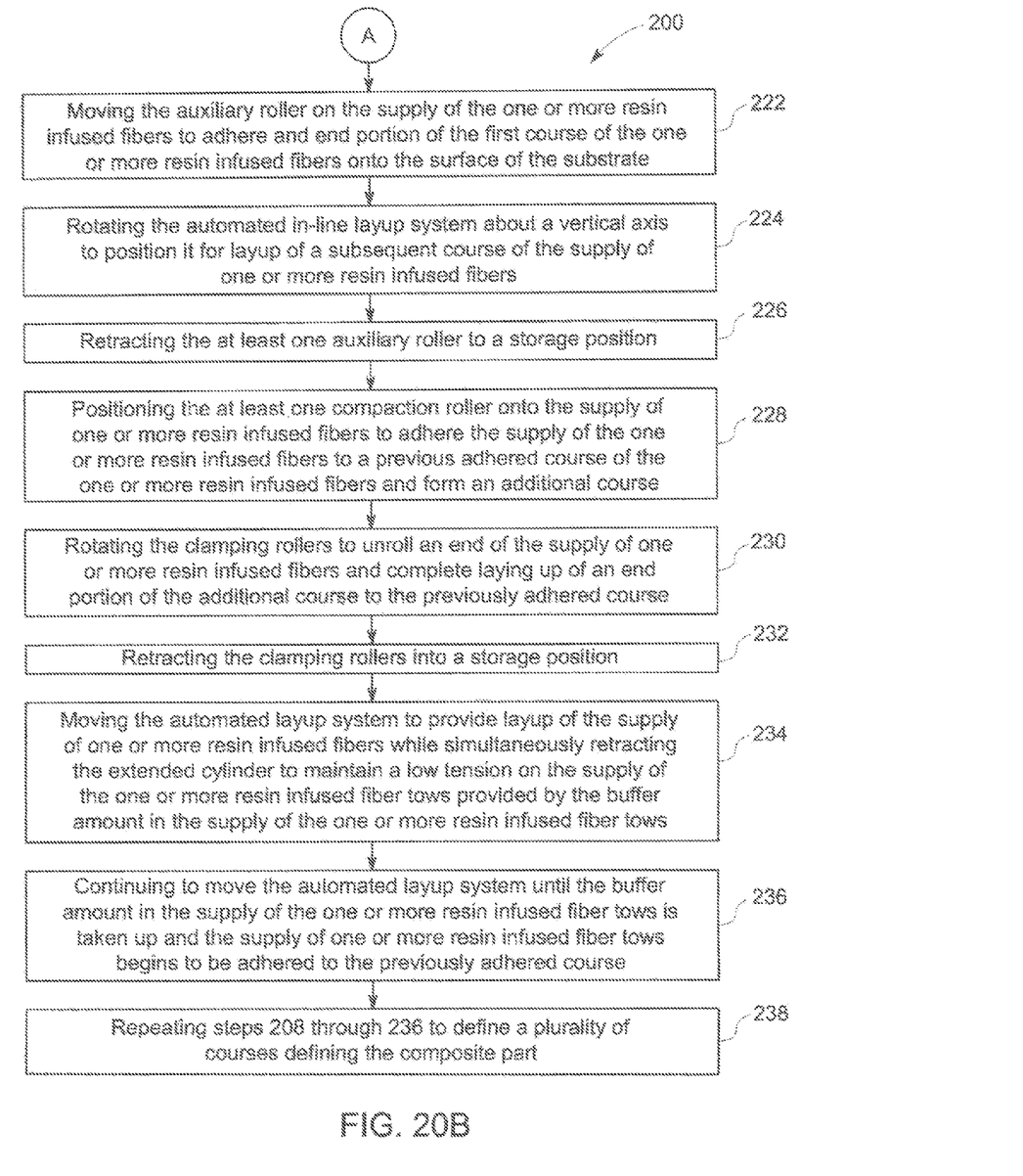

Referring now to FIG. 20A and FIG. 20B, illustrated is a flow chart depicting the method as previously described with reference to FIGS. 2-19. Illustrated is a method 200 of fabricating a composite part using the automated in-line manufacturing system 100 including the steps: infusing a resin into one or more fiber tows to form a supply of one or more resin infused fiber tows 200; delivering the supply of the one or more resin infused fiber tows to an automated in-line layup system configured to receive the supply of the one or more resin infused fiber tows 202; positioning the supply of the one or more resin infused fiber tows within the automated layup system and between a surface of the compaction roller and a surface of the substrate, defining a feed-through path 204; disposing an initial portion of the supply of the one or more resin infused fiber tows onto the surface of the substrate at a first tension 206; laying up a course of the one or more resin infused fiber tows onto the surface of the substrate 208; positioning the at least one auxiliary roller proximate an end portion of the first course of the one or more resin infused fiber tows that are adhered to the surface of the substrate 210; retracting the at least one compaction roller from the one or more resin infused fiber tows 212; extending the cylinder to move the guide roller and generate a buffer amount in the supply of the one or more resin infused fiber tows 214; positioning a plurality of clamping rollers above and below the supply of the one or more resin infused fibers 216; clamping the clamping rollers to the supply of the one ore more resin infused fibers 218; cutting the supply of the one or more resin infused fibers between the plurality of clamping rollers and the at least one auxiliary roller 220; moving the auxiliary roller on the supply of the one or more resin infused fibers to adhere and end portion of the first course of the one or more resin infused fibers onto the surface of the substrate 222; rotating the automated in-line layup system about a vertical axis to position it for layup of a subsequent course of the supply of one or more resin infused fibers 224; retracting the at least one auxiliary roller to a storage position 226; positioning the at least one compaction roller onto the supply of one or more resin infused fibers to adhere the supply of the one or more resin infused fibers to a previous adhered course of the one or more resin infused fibers and form an additional course 228; rotating the clamping rollers to unroll an end of the supply of one or more resin infused fibers and complete laying up of an end portion of the additional course to the previously adhered course 230; retracting the clamping rollers into a storage position 232; moving the automated layup system to provide layup of the supply of one or more resin infused fibers while simultaneously retracting the extended cylinder to maintain a low tension on the supply of one or more resin infused fiber tows provided by the buffer amount in the supply of the one or more resin infused fiber tows 234; continuing to move the automated layup system until the buffer amount in the supply of the one or more resin infused fiber tows is taken up and the supply of one or more resin infused fiber tows begins to be adhered to the previously adhered course 236; and repeating steps 208 through 236 to define a plurality of courses defining the composite part 238.

The disclosed inline automated infusion delivery and layup system is intended for use with resin infused material where the resin is very soft or in a semi-liquid state. Beneficially, by integrating the automated resin delivery, application and infusion system 110 in-line and integrated with the automated layup system 112, advanced composite structures can be fabricated, despite having complex shapes without requiring tow starts, stops, adds and drops or requiring separate manufacturing processes and steps to achieve delivery, application and infusion of fiber tows and subsequent layup of the infused fiber tows. The resulting composite automated in-line manufacturing system integrates an in-line resin delivery, application and infusion system and automated layup system of the present disclosure thus providing fabrication of these complex composite structures with improved control and at lower cost than conventional fiber placement systems.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An automated in-line manufacturing system for applying a resin to one or more fiber tows, infusing the one or more fiber tows with the resin to form one or more infused fiber tows and subsequent layup of the one or more infused fiber tows to form a composite part, wherein each of the one or more fiber tows is moving at a respective fiber speed, the automated system comprising:
   an automated resin delivery, deposition and infusion system configured to form the one or more resin infused fiber tows;
   an automated layup system configured in-line with the automated resin delivery, deposition and infusion system to receive a feed-through of the one or more resin infused fiber tows, the automated layup system comprising at least one guide roller coupled to an extending cylinder, wherein the extending cylinder is configured to extend the guide roller and generate a buffer amount in the one or more resin infused fiber tows and wherein the buffer amount is always increased when the guide roller is extended, at least one compaction roller disposed downstream from the guide roller and configured to adhere the one or more infused fiber tows to a surface of a substrate, at least one auxiliary roller disposed downstream from the compaction roller and a positioning and control system to orient the guide roller, the compaction roller and the auxiliary roller relative to the surface of the substrate; and
   a controller configured to control the automated layup system, and control tension of the one or more resin infused fiber tows within the automated layup system.

2. The automated in-line system of claim 1, wherein the controller is further configured to control the automated resin delivery, deposition and infusion system.

3. The automated in-line system of claim 2, further comprising one or more sensors for monitoring a tension of the one or more resin infused fiber tows within the automated layup system.

4. The automated in-line system of claim 1, further comprising a cooling module disposed in-line between the automated resin delivery, deposition and infusion system and the compaction roller.

5. The automated in-line system of claim 1, wherein the automated layup system further comprises a plurality of clamping rollers disposed in-line between the compaction roller and the auxiliary roller.

6. The automated in-line system of claim 1, wherein the one or more resin infused fiber tows is configured as a resin infused fiber tape.

7. The automated in-line system of claim 1, where the one or more resin infused fiber tows is configured as a plurality of resin infused composite fibers.

* * * * *